No. 761,657. PATENTED JUNE 7, 1904.
W. CHRISTIE.
MOTOR VEHICLE.
APPLICATION FILED JAN. 18, 1904.
NO MODEL. 6 SHEETS—SHEET 2.

No. 761,657. PATENTED JUNE 7, 1904.
W. CHRISTIE.
MOTOR VEHICLE.
APPLICATION FILED JAN. 18, 1904.
NO MODEL. 6 SHEETS—SHEET 3.

WITNESSES:
J. W. Bryce
Edgar J. Williams

INVENTOR
Walter Christie
By
Chapin Raymond Marble
HIS ATTORNEYS

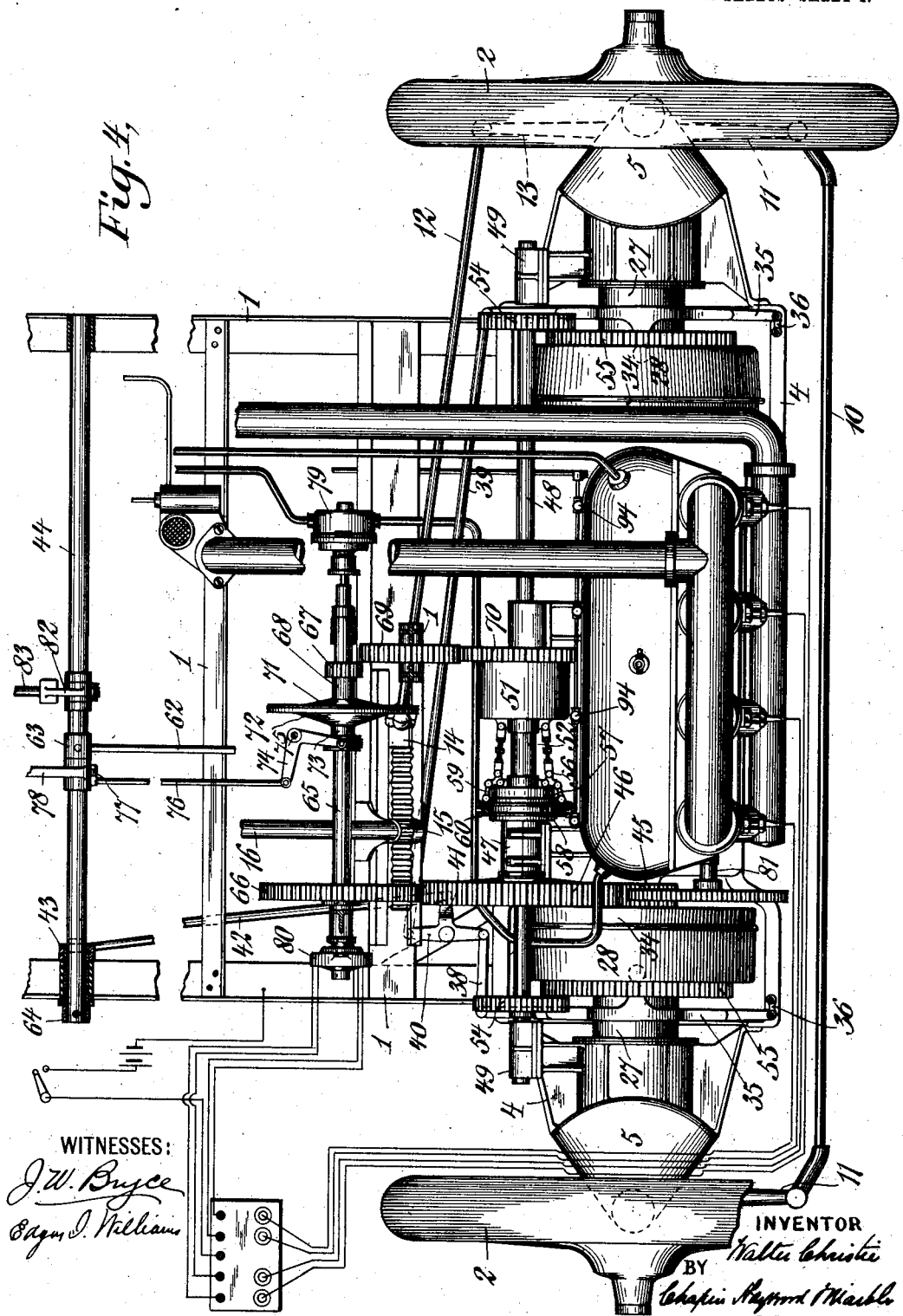

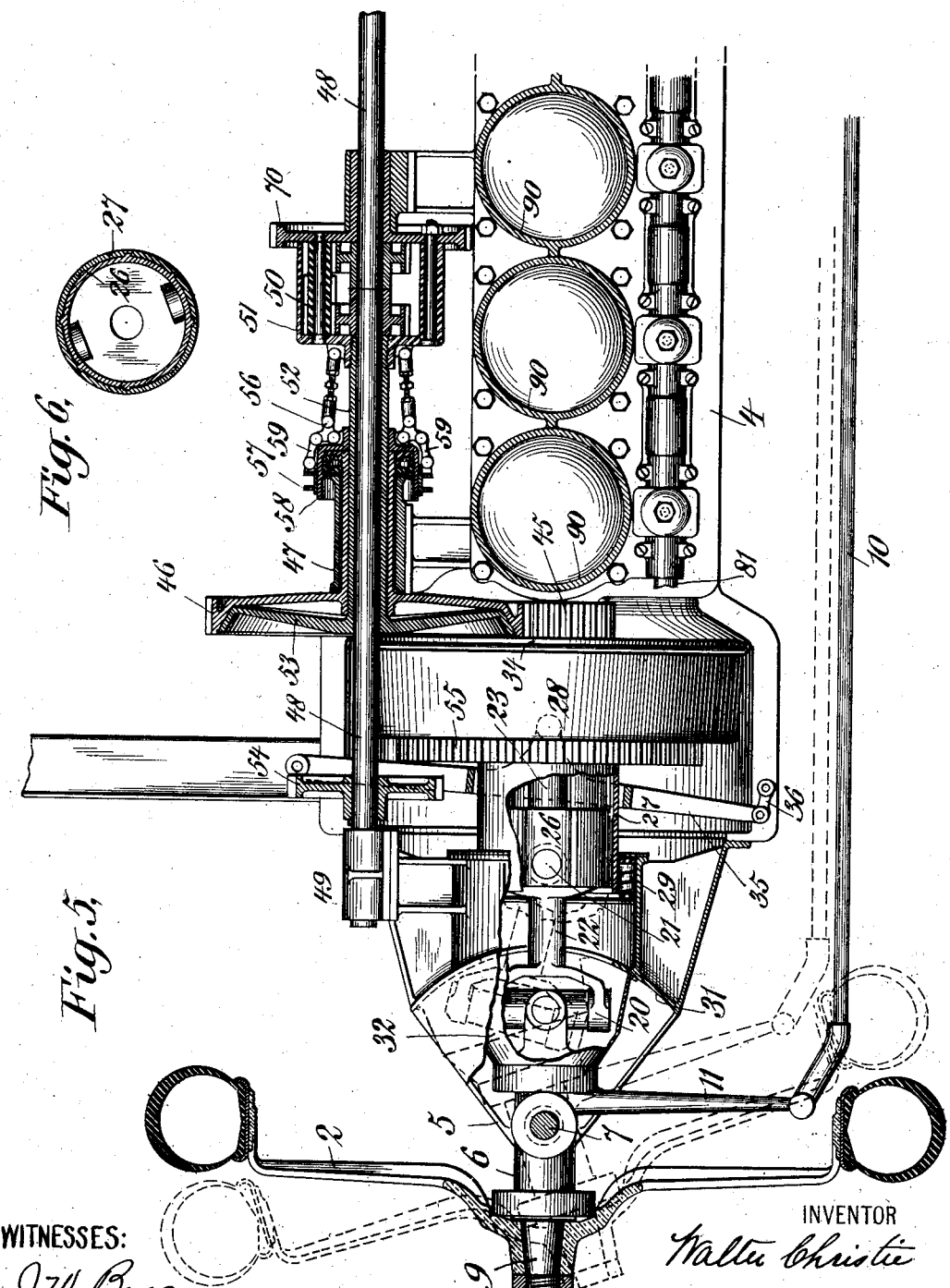

No. 761,657. PATENTED JUNE 7, 1904.
W. CHRISTIE.
MOTOR VEHICLE.
APPLICATION FILED JAN. 18, 1904.
NO MODEL. 6 SHEETS—SHEET 6.
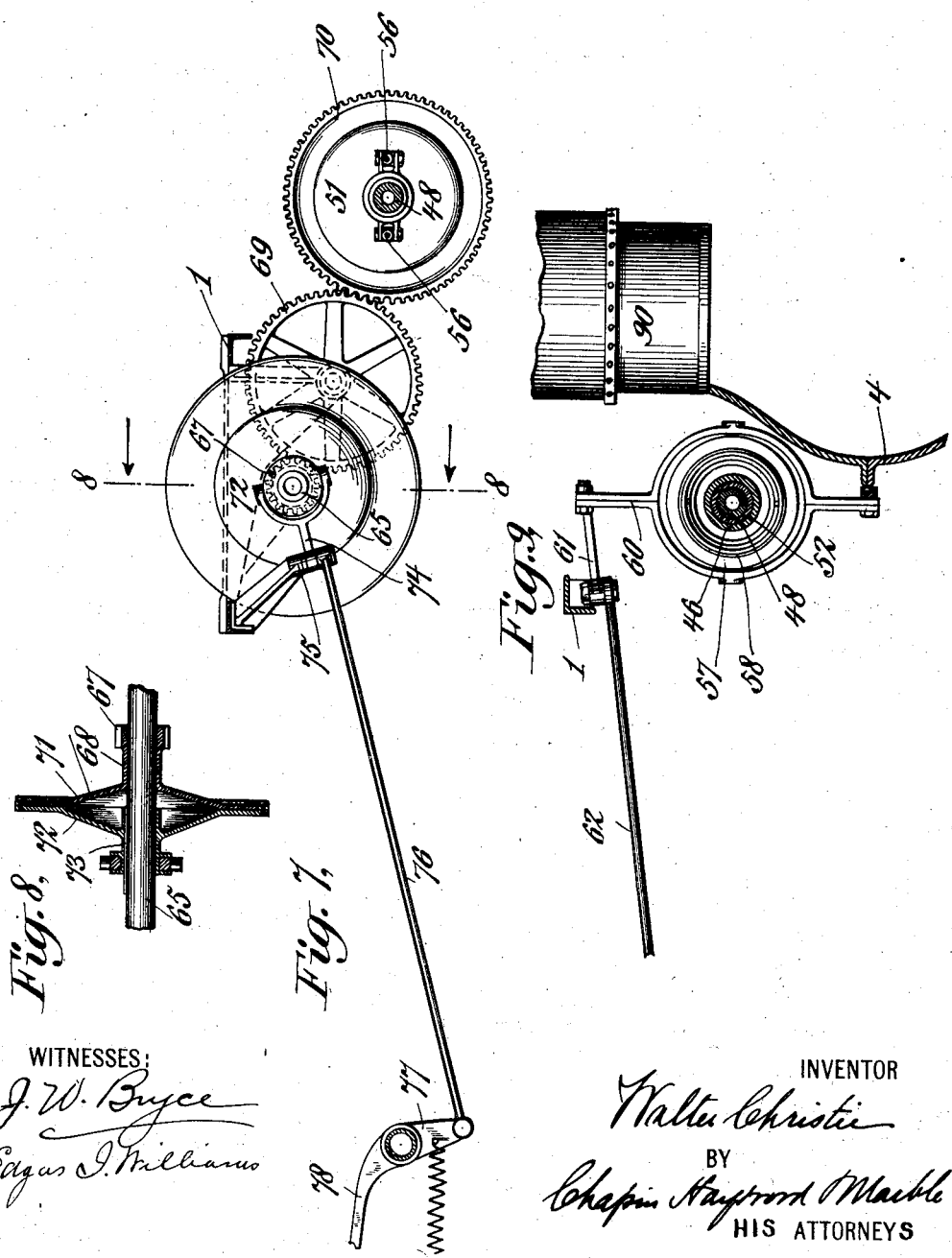

No. 761,657.                                                                                          Patented June 7, 1904.

UNITED STATES PATENT OFFICE.

WALTER CHRISTIE, OF NEW YORK, N. Y.

MOTOR-VEHICLE.

SPECIFICATION forming part of Letters Patent No. 761,657, dated June 7, 1904.

Application filed January 18, 1904. Serial No. 189,457. (No model.)

*To all whom it may concern:*

Be it known that I, WALTER CHRISTIE, a citizen of the United States of America, and a resident of New York city, county and State of New York, have invented certain new and useful Improvements in Motor-Vehicles, of which the following is a specification, reference being had to the accompanying drawings, forming a part thereof.
My invention relates to improvements in motor-vehicles; and it consists in the location of the driving-motor between two combined driving and steering wheels of the vehicle and with its main driving-shaft adapted to be directly connected to said driving-wheels, in novel and improved transmission-gearing and clutch mechanism for throwing the motor out of and into direct drive with the wheels and for low-speed and reversing driving, in an improved casing constituting a combined motor-casing and vehicle-axle, in an improved spring-support for that end of the body at which the motor is located, in improved shields or covers for the universal joints forming a part of the main drive-shaft, in an improved arrangement of a circulating-pump, and in various other features, details of construction, and combination of parts, as will hereinafter more fully appear.
The main objects of my invention are to secure the greatest simplicity of high-speed front-wheel drive, combined with front-wheel steering, so that a comparatively light and low-power machine may be capable of very high speed; to improve the construction and operation of the transmission and change-speed mechanism, so that the machine may also be adapted for operation at moderate speeds for touring and similar purposes; to simplify and improve the control, so that the operator will have but little operating mechanism and this of the simplest description, and generally to simplify and improve machines of this description.
I will now proceed to describe a motor-vehicle embodying my invention and will then point out the novel features in claims.

Figure 1:
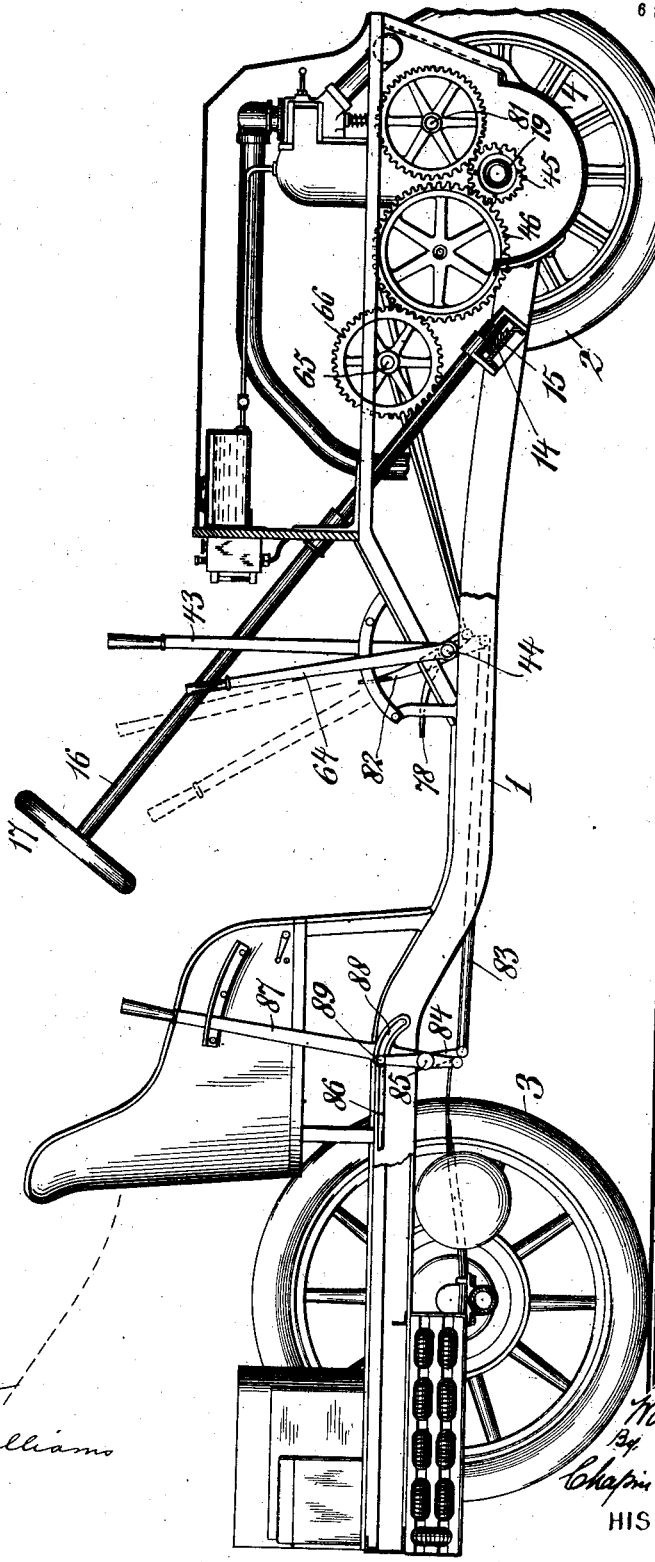
Figure 2:
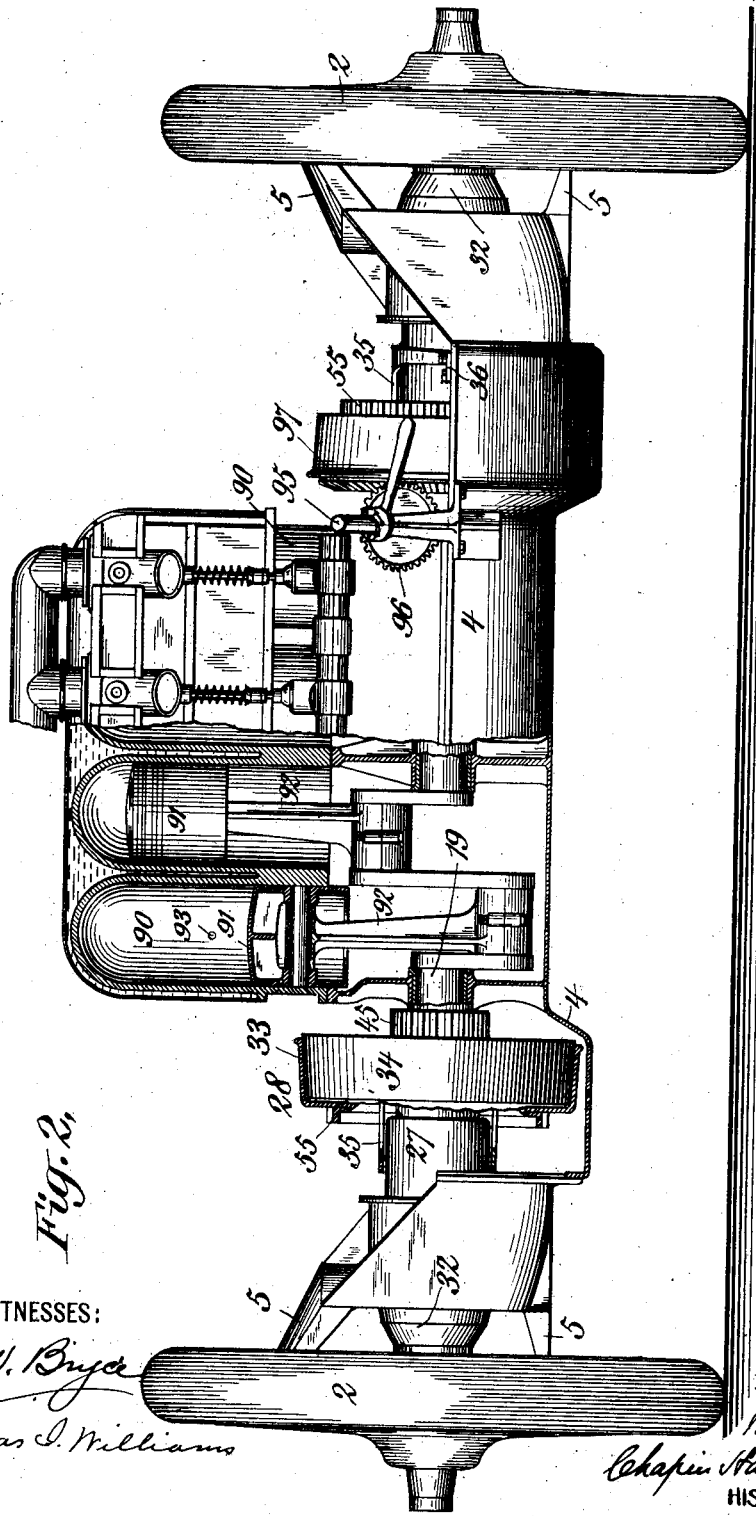
Figure 3:
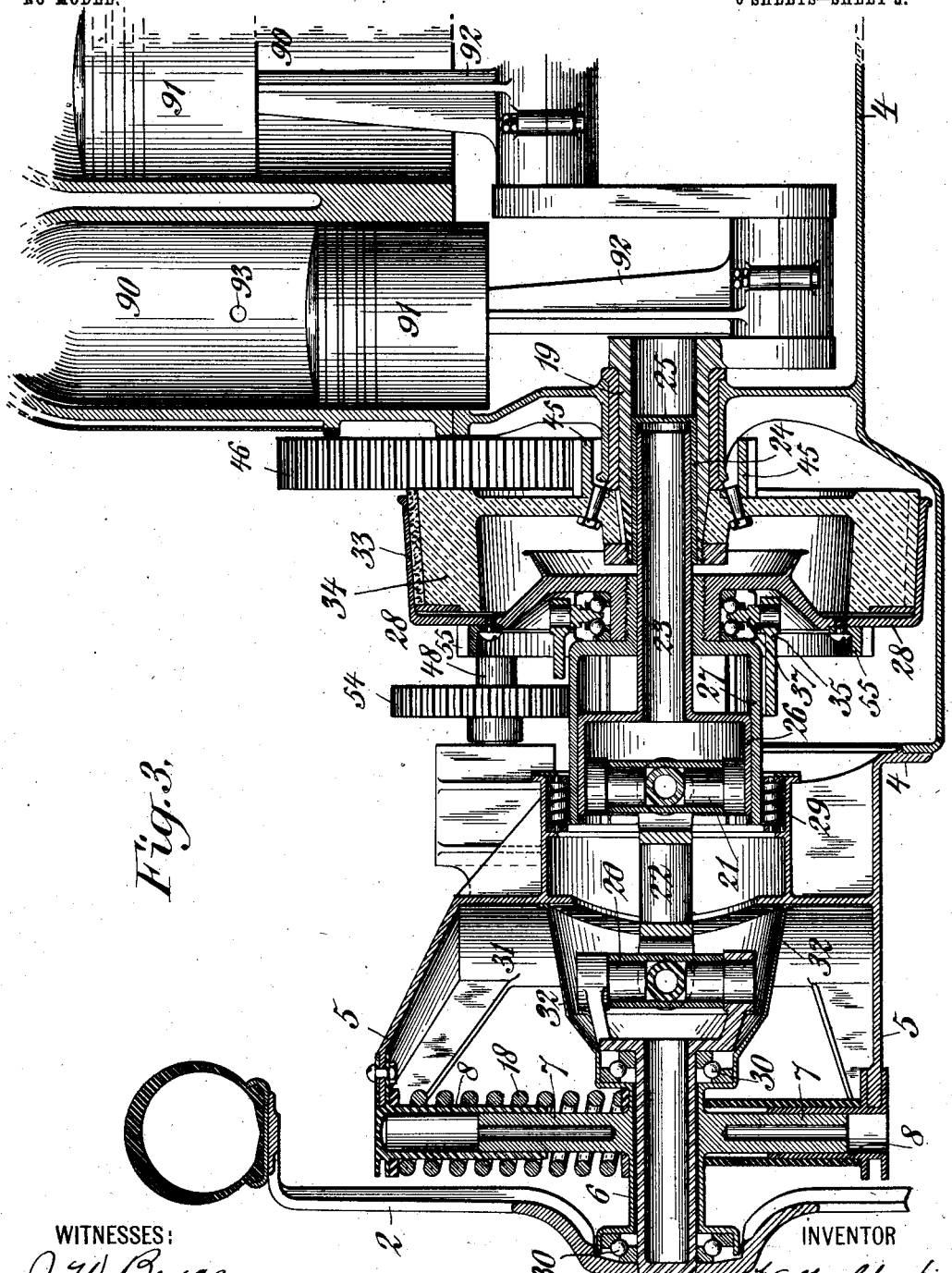

In the drawings, Figure 1 shows a view, partly in side elevation and partly in longitudinal section, of a motor-carriage embodying my invention. Fig. 2 is a front view of the machine, partially broken away, in central longitudinal vertical section. Fig. 3 is a view in vertical longitudinal section of certain parts of the machine upon a considerably-enlarged scale, the plane of section being taken centrally through one of the drive-wheels, the drive-shaft therefor, and the motor. Fig. 4 is a top view of the front portion of a vehicle with certain parts removed and other parts broken away. Fig. 5 is a detail top view, partly broken away and partly in horizontal section, showing certain parts at the front or driving end of the machine. Fig. 6 is a detail view in transverse section of a sliding connection employed between one of the members of a clutch employed and one of the end sections of the drive-shaft. Fig. 7 is a detail view in side elevation of part of the transmission mechanism, including part of the reversing back-gear train. Fig. 8 is a detail view in central transverse section through a pair of friction-disks employed in throwing the back gearing into operative relation, the plane of section being taken upon the line 8 8 of Fig. 7. Fig. 9 is a detail view transversely of the counter-shaft, showing certain details of the clutch-operating mechanism for the low-speed forward drive.

The vehicle shown has a body or frame 1, a pair of front wheels 2, and a pair of rear wheels 3. The front wheels 2 constitute the driving-wheels of the machine and are also employed for steering purposes. The rear wheels 2, as shown, are idler or trailer wheels only.

The front wheels are connected to a transverse casing, designated as a whole by reference character 4, which constitutes, in effect, the front axle of the machine. The central portion of the casing 4 constitutes a crank-casing for the motor and serves as a support for the cylinders and driving mechanism of the motor, while the end portions of the casing are provided with horns 5, to which the bearing members 6 for the wheels are connected. The connection between the bearing members 6 and the horns 5 is a pivotal one, the bearing members being provided with pins or studs 7, arranged to be received within sockets 8, carried by the said horns. The axes of said pivots are in straight lines lying in the plane of rotation of the wheels and passing centrally through the tires of the wheels and intersecting their axes of rotation. The bearing members have a bearing connection with portions rigid with the said wheels, said portions herein comprising short shaft-sections 9, bolted to the wheels 2, and comprising a portion of the main drive-shaft, as will appear hereinafter. It will thus be seen that the wheels are free to swing about independent axes upon the said frame or casing, and so may be employed for steering purposes. A connecting link or rod 10, pivoted or swiveled to arms 11, extending outwardly from the bearing members 6, connects the two wheels together, so that one wheel is compelled to partake of the movements of the other, and another link or connecting-rod 12 is connected at one end to an arm 13, extending rearwardly from one of the wheel-bearing members 6, and at the other end is pivoted or swiveled to a sliding rack-bar 14. The sliding rack-bar 14 is engaged by a pinion 15, arranged upon the lower end of a steering-spindle 16, the upper end of which is provided with the usual steering-wheel 17.

The weight of the casing and parts carried thereby is yieldingly supported by coil-springs 18, located between the upper horns 5 of the casing and the bearing members 6. These coil-springs 18 act then as front axle-springs for the vehicle, and the pin-and-socket connections 7 and 8 being accurately fitted to each other with a sliding fit form, in effect, air dashpots, which tend to prevent a too sensitive action of the springs.

The motor is of the internal-combustion reciprocating-piston type, and the crank-shaft 19 therefor is mounted in suitable bearings in the casing 4. The location of this shaft and the tension of the springs 18 is such that under ordinary running load the axis of the said shaft is designed to be substantially coincident with the axis of rotation of the front-wheels. The crank-shaft 19 forms a part of the main driving-shaft as a whole, such main driving-shaft comprising end sections and the intermediate crank-shaft section 19. The end and intermediate shaft-sections are arranged to be connected or disconnected in driving relation, as may be desired, and as will appear hereinafter. Each said end section comprises one of the short shaft-sections 9 above referred to, two universal joints 20 and 21, a connecting shaft-section 22 between them, and a tubular sliding shaft-section 23. The different parts of each of the said end sections are connected or secured together in driving relation at all times.

Each of the tubular sliding shaft-sections 23 has a bearing at one end in a hollow portion of the intermediate crank-shaft section 19, a liner or bearing-sleeve 24 being provided between the surfaces of the intermediate and end shaft-sections, said sleeves or liners being each preferably provided with a head 25 at its inner end, so as to hold back oil employed in the central portion of the casing 4 for splash lubrication in the motor. Each tubular sliding shaft-section is free to both slide or rotate in the bearing thus formed between it and the intermediate crank-shaft section. At its other end the tubular shaft-section has an enlarged cup-shaped portion 26, forming, in effect, a part of the universal joint 21, and this cup-shaped portion is arranged with a sliding fit in a cylindrical extension 27, forming a part of a clutch member 28. The cup-shaped portion 26 and the cylindrical extension 27 are splined together, so that while they are permitted freely to slide longitudinally with respect to each other they are absolutely secured together in rotative relation. The cylindrical extension 27 is arranged to rotate upon roller-bearings 29 between it and the casing 4, so that the tubular sliding shaft-sections 23 are supported in bearings at both of their ends against any but a longitudinally-sliding movement with relation to the casing 4. The short shaft-sections 9, as above stated, are rigidly connected to the wheels 2, and ball-bearings 30 are interposed between these short shaft-sections and the wheel-bearing members 6. The wheel-bearing members are permitted two movements with respect to the casing 4, one a vertical movement, by reason of the yielding spring connection therewith, and the other a movement in a horizontal plane due to the pivotal connection therewith, and the short shaft-sections 9 being in bearing relation therewith partake, of course, of these movements. The universal joints 20 and 21, together with the sliding movement of the tubular sliding shaft-sections, permit these movements of the short shaft-sections 9 while maintaining them in proper relation with the intermediate crank-shaft section 19.

The casing 4 is provided at each end with a portion having a curved surface 31, the said curved surfaces having arcs formed with the axes of the pivotal connections between the wheel-bearing members and the casing as centers, the wheel-bearing members being each provided with a cap 32, extending inwardly, and having a face fitted to the curved surfaces 31. The caps 32, together with portions of the casing 4, serve to inclose the universal joints and protect them against injury from dust or other causes, while on account of their shape and formation they in no way prevent or impede free relative vertical movements of the bearing members with respect to the casing nor free swinging movements in a horizontal plane about the axes of their pivotal connections.

In order that the axes of the pivotal connections between the bearing members and the casing may be in lines lying in the plane of rotation of the wheels and passing centrally through the wheel-tires and intersecting their axes of rotation, the said wheels are provided with overhanging rims and offset spokes, as shown. This relationship of the pivotal axes with respect to the wheels gives the least resistance to steering, because with such a construction and arrangement of parts the wheels in steering rotate about axes which are coincident with the points of their support upon the ground.

The clutch members 28, above referred to, have internal cone friction-surfaces 33, arranged to engage similar external cone friction-surfaces forming the outer peripheries of fly-wheels 34. The fly-wheels 34, of which there are two, are rigidly secured to the outer ends of the intermediate crank-shaft section 19. Shipping-levers 35, pivotally connected by means of short links 36 with the casing 4 carry operating-rings 37. The operating-rings 37 are arranged to rotate with respect to the clutch members 28, which they respectively engage, but are secured thereby against relative lateral movement—i. e., movement longitudinally of their axes of rotation. Ball-bearings are shown as provided between the operating-rings 37 and their respective clutch members in order to prevent undue friction between the parts. The shipping-levers 35 are connected, by means of connecting-links 38 and 39, with oppositely-extending arms of an operating-lever 40. The operating-lever 40 has an arm 41 extending at right angles thereto and pivotally connected to one end of a connecting-rod 42. The other end of the connecting-rod 42 is pivoted to the short arm of a hand-lever 43, suitably arranged in the machine, so that it may be operated by a person seated in the vehicle. The hand-lever 43 is loosely mounted upon a transverse shaft 44, upon which certain other levers and foot-pedals are also mounted, as will presently be described. Operation of the hand-lever 43 will then throw the clutch members 28 into or out of engagement with the fly-wheels 34, forming the clutch members complementary thereto, and the said clutch members 28 being, as above set forth, in constant driving relation with the end shaft-sections and the fly-wheels being in constant driving relation with the intermediate or crank shaft section the shaft-sections will thus be connected or disconnected from driving relation with each other at will. As the parts are arranged the clutch members will be in engagement with each other and the shaft-sections in driving relation when the hand-lever 43 is pushed all the way forward. When the hand-lever is drawn back, the clutch members will be released and the shaft-sections will be out of driving relation with each other. When in driving relation, it will be seen that the motor is directly connected to the front driving-wheels, the main shaft of the engine constituting directly the drive-shaft therefor. When so connected, the vehicle is designed for very high speeds, and by reason of this direct connection there will be the least possible loss through friction, as necessarily occurs where the drive passes through intermediate gearing, &c. No compensating gear is provided between the two driving-wheels when the machine is thus connected, as the amount of steering possible while the machine is thus directly connected, owing to the high speed which the machine will have at such times, is so slight as to render such compensating gearing unnecessary. It will be noted, however, that immediately the hand-lever is pulled back to release the clutches the end shaft-sections are then not only free from the intermediate or crank shaft section, but are also free from any engagement with each other, so that immediately the wheels are freed from this direct driving relation they are entirely free to turn independently of each other.

The fly-wheels 34, as shown, are provided with overhanging peripheries, and the clutch members 28 are each provided with inwardly-projecting flanges, which are arranged to deflect any oil which may work out from the crank-casing and prevent same from flowing toward the friction-surfaces of the clutch members, and thereby impairing their efficiency.

In the foregoing I have described the direct drive forward at high speed and the entire release from driving connection, whereby the machine runs free.

I will now proceed to describe the means provided for driving the machine at low speed forward and then the means for driving the machine backward.

When driving the machine forward at low speed or rearward also at low speed, it is practicable, of course, to steer the machine within such limits as to render it necessary to provide some means for permitting independent movement of the driving-wheels, and hence I provide a compensating gear, which is included in the transmission-gear, for low speeds. The drive for the low speed is from a pinion 45, fast upon the central or intermediate shaft-section 19, in the present instance shown as bolted to one of the fly-wheels 34. This pinion is in mesh with a spur-gear 46, having a hub arranged to rotate loosely in a bearing-head 47 upon the casing 4. A counter-shaft 48, journaled in bearings 49, passes through the said head and rotates upon an axis coincident therewith. The counter-shaft 48 is a two-part counter-shaft and is connected together by compensating gearing 50. The compensating gearing 50 may be of any well-known type and is so well known in the art as not to require detail description herein. The outer or driving member 51 of the compensating gearing is rigidly secured to a sleeve 52, formed as the extension of the hub of a friction-clutch member 53. The sleeve 52 is mounted to rotate upon the counter-shaft 48, and a portion of the same is contained within the hub of the spur-wheel 46. The sleeve 52 is, however, mounted freely with respect to the said counter-shaft and with respect to the hub of the said gear-wheel. Each part of the two-part counter-shaft is provided with a pinion 54, having teeth arranged in line with the teeth of spur-gears 55, with which each of the direct drive-clutch members 28 are provided. When the machine is in direct high-speed drive connection or is free of driving connection, as above described, the spur-gears 55 are out of mesh with the pinion 54. The hand-lever 43, however, when pulled all the way back will move the clutch members 28 such a distance as to bring the teeth of the spur-gears 55 in mesh with the pinions 54, and in such relation the machine will be in a condition to be driven through the back gearing just described and at low speed, provided the low-speed clutch member 53 is in driving relation with the spur-gear 46. To effect this, a set of toggle-links 56 is provided which, when operated in one direction, will force the gear-wheels 46 against the friction member 53 of the low-speed clutch, so as to cause them to operatively engage each other in driving relation. A movement of the toggle-links in the opposite direction will free the spur-gear 46 from operative engagement with the friction member 53 of the low-speed clutch and release the same from driving relation. The toggle mechanism is controlled by means of a shift-ring 57, slidably mounted upon a head 58, which in turn is arranged to slide upon the sleeve 52, but which is in constant rotative engagement therewith. The shift-ring 57 is connected to the toggle mechanism by means of links 59, pivoted thereto, and to the shorter links of the set of toggle-links. The shift-ring 57 is engaged by a shifting lever 60, pivoted at one end by a suitable link connection to the casing 4, engaging at its other end one arm of a bell-crank lever 61. The other arm of the bell-crank lever is pivoted to a connecting rod or link 62, connected at its other end to a short arm 63, rigidly secured to the transverse shaft 44. The shaft 44 is operated by means of a short hand-lever 64, projecting upward at the side of the machine and in convenient position to be handled by an operator in the driving-seat of the vehicle. The parts are so arranged that when the short lever is all the way forward the toggle-links will be thrown outward and the spur-gear 46 and friction member 53 of the low-speed clutch will be out of driving relation with each other. This is the position of the lever and the clutch mechanism for forward driving at high speed or for free running or drifting of the vehicle. When the short lever 64 is drawn back as far as it will go, the toggle-links will be forced inward or straightened, so as to cause the friction-surfaces of the spur-gear 46 and clutch member 53 to operatively engage, whereby the compensating gear will be thrown into driving connection with the driving-pinion 45. If then the long hand-lever 43 be pulled all the way back, so as to cause the spur gear-wheels 55 to engage the pinions 54 on the two sections of the counter-shaft, the machine will be driven at low speed from the pinion 45 upon the intermediate crank-shaft section to the gear-wheel 46, then through the low-speed clutch member 53 to the outer member of the compensating gearing, through the compensating gearing to the counter-shaft, thence through the pinions 54 to the spur gear-wheels 55 upon the end driving-shaft sections to the driving-wheels. Thus the machine will at such times be connected for low-speed driving, and the driving-wheels will be driven from a high-speed motor at low speed through compensating gearing. For reversing, a second counter-shaft 65 and back gearing are employed. The second counter-shaft 65 is mounted in suitable bearings stationary with the main frame of the machine and carries rigidly secured thereto a gear-wheel 66, which is arranged in constant mesh with the spur-gear 46 upon the counter-shaft 48. It will be remembered that the spur-gear 46, which is in mesh with the drive-pinion 45, is always running, and hence the second counter-shaft 65 will also run continuously. A pinion 67, carried by a sleeve 68, is loosely mounted upon the second counter-shaft 65. The teeth of this pinion 67 are arranged in a line with the teeth of an idler-gear 69, mounted to rotate freely in suitable bearings in a portion stationary with the frame of the machine, said idler-gear 69 arranged in mesh with the teeth of a gear-wheel 70, secured to or formed as a part of the outer member 51 of the compensating gear upon the counter-shaft 48.

The sleeve 68 (see particularly detail Fig. 8) is secured to or formed as a part of a friction-disk 71, said friction-disk arranged to frictionally engage the face of a corresponding friction-disk 72, secured to or formed as a part of a sleeve 73. The sleeve 73 is rotatably mounted upon the second counter-shaft 65, but is permitted to slide longitudinally thereon, a splined connection maintaining them in rotative engagement, but permitting such sliding movement. The sleeve 73 is engaged by a bell-crank lever 74, pivoted at 75, the other arm of which is connected, by means of a connecting-rod 76, with the short arm 77 of a foot-pedal 78. When the foot-pedal 78 is depressed, the bell-crank lever 74 is rocked upon its pivotal support 75 and the sleeve 73 is moved along the shaft 65. The sleeve 68, carrying the pinion 67, is moved with the sleeve 73 until the teeth of the pinion 67 are in mesh with the teeth of the idler gear-wheel 69. When the teeth of the pinion 67 are fully in mesh with the teeth of the idler-gear 69, the side of the pinion 67 engages the stationary bearing, or the sleeve 68 is in some other way prevented from moving farther longitudinally, and pressure being still applied to the pedal 78 the friction-disks 71 and 72 will be caused to so frictionally engage each other as to cause them to rotate together. For driving the machine backward it will be necessary then to have the long hand-lever 43 all the way back, so as to cause the spur-gears 55 to engage the pinions 54 to throw in the counter-shaft gearing, to have the short hand-lever 64 all the way forward, so as to cause the low-speed friction-clutch to be in its out-of-operation position, and then to press hard down upon the foot-pedal 78, so as to slide the pinion 67 into engagement with the idler 69 and to frictionally engage the reversing-gear friction-disks 71 and 72. The drive will now be from the main drive-pinion on the intermediate or crank-shaft section of the drive-shaft to the spur gear-wheel 46, rotating loosely about the counter-shaft 48, thence to the gear-wheel 66, fast upon the second counter-shaft 65. From the counter-shaft 65 the drive will pass through the reversing-clutch friction-disks 72 71 and pinion 67 to the idler-gear 69, thence to the gear 70 upon the outer member of the compensating gear, through the compensating gear to the two-part counter-shaft 48, thence through the pinions 54 to the spur-gears 55 upon the end shaft-sections of the main driving-shaft to the driving-wheels.

The amount of friction possible between the friction-disks 71 72, comprising the back-gear friction-clutch, is very much less than that which may occur between the coacting faces of the inner periphery of the gear-wheel 46 and the outer periphery of the clutch member 53, comprising the low-speed forward clutch mechanism, and the amount of friction possible at any time between the two disks 71 and 72 is never sufficient to cause the two to become jammed or locked together. Therefore should the reversing-pedal 78 be depressed while the short hand-lever 64 is in a rear position, and hence the slow-speed forward clutch mechanism in operative engagement, the members of the reversing-clutch would merely slip with respect to each other and no harm would be done to the machine. In this connection it may be noted that when the high-speed clutch is operated and the main driving-shaft sections are directly united in driving relation the spur gear-wheels 55 are of necessity out of engagement with the counter-shaft pinions 54, so that should the low-speed clutch be thrown into operative engagement while the high-speed clutch was also engaged the only result would be the idle turning of the counter-shaft 48.

The second counter-shaft, as set forth above, runs constantly, because of its direct gear connection through gear-wheel 65, spur-gear 46, and pinion 45. The circulating-pump 79 for the cooling-water of the motor is arranged to be operated by the second counter-shaft 65, and in this way just sufficient resistance is put upon the shaft to prevent backlash or rattling occurring in the gearing 66 46 45 when the machine is running free or in high-speed driving relation. The ratio between the gears 45 and 66 is in the present instance as one is to two, and hence the shaft 65 may be also employed to operate the commutator 80 for the electric sparking system for the motor. The cam-shaft 81 of the motor is usually employed for the purpose of rotating the commutator; but in this instance the position of the second counter-shaft is so much more convenient for this purpose that the speed thereof is arranged to be the same as that of the cam-shaft, and the commutator is then operated thereby, as above set forth.

The form of brake I preferably employ for the machine is a combined hand-lever and foot-pedal brake. A foot-pedal 82, loosely mounted upon the transverse shaft 44, is connected, by means of a connecting-link 83, with a rocking lever 84, pivoted at 85 to the frame of the machine. A connecting-link 86 connects the rocking lever 85 with a brake of any suitable form. A hand-lever 87 is also pivotally mounted about an axis coincident with the axis of the pivotal support 85 for the rocking lever 84. The hand-lever 87 has a slot 88, arranged to receive a projecting pin 89 or other portion projecting from the rocking lever 84, so that the said lever 84 may rock freely about its axis when braking movements are applied thereto by movements of the foot-pedal 82 and without interference from the said hand-lever 87. At the same time the hand-lever 87 may be employed to apply the brake, if desired, as when the said lever is pushed forward the rear wall of the slot 88 will engage the pin or projection 89 of the rocking lever 84 and rock the said rocking lever about its support to apply the brake in the same manner as when the foot-pedal is operated.

The motor herein illustrated has four vertical cylinders 90, in which are mounted reciprocating pistons 91, connected by connecting-rods 92 to the crank-shaft 19. Intermediate their lengths each of the cylinders 90 is provided with an opening 93, and discharge-cocks 94 serve to control egress of fluid through the said opening. The openings 93 are arranged to be overridden by the pistons 91 in their strokes, but are so positioned that during a portion of the strokes of the pistons 91 the openings will be uncovered to the interior of the cylinder. If the discharge-cocks 94 are opened, there will be only partial compression during the compression-stroke of the pistons and the power of the motor will be considerably cut down. These cocks may be opened when first starting up the engine, and they may also be opened when it is desired to use but little power. Starting up of the engine may be effected by means of a starting-spindle 95, (see particularly Fig. 2,) carrying a bevel-pinion 96 and which engages with a bevel-gear 97, secured to and carried by one of the engine fly-wheels 34 or some other part secured to the engine crank-shaft.

It will be obvious that the foregoing is but one embodiment of my invention and that the same is capable of many and varied modifications within the spirit and scope of my invention, and, further, that certain parts may be employed in connection with other parts of different construction. Hence I do not desire to be limited only to the precise details of construction and combination of parts herein.

What I claim is—

1. In a motor-vehicle, the combination with a transverse casing, of driving-wheels, bearing members therefor, a yielding connection between said bearing members and said casing, and a drive-shaft mounted in bearings in said casing, said drive-shaft secured to the said drive-wheels.

2. In a motor-vehicle, the combination with a transverse casing, of driving-wheels, bearing members therefor, a yielding connection between said bearing members and said casing, and a drive-shaft mounted in bearings in said casing, said drive-shaft secured to the said drive-wheels, and including universal joints.

3. In a motor-vehicle, the combination with a transverse casing, of driving-wheels, bearing members therefor, a yielding connection between said bearing members and said casing, and a drive-shaft mounted in bearings in said casing, said drive-shaft secured to the said drive-wheels, and including universal joints, and a telescopic section.

4. In a motor-vehicle, the combination with a transverse casing, of driving-wheels, bearing members therefor, a yielding connection between said bearing members and said casing, a drive-shaft mounted in bearings in said casing, said drive-shaft comprising end sections and an intermediate section, and clutch mechanism for connecting said sections together, the end sections of said shaft secured to the said drive-wheels.

5. In a motor-vehicle, the combination with a transverse casing, of driving-wheels, bearing members therefor, a yielding connection between said bearing members and said casing, a drive-shaft mounted in bearings in said casing, said drive-shaft comprising end sections and an intermediate section, and clutch mechanism for connecting said sections together, the end sections of said shaft secured to the said drive-wheels, and including universal joints.

6. In a motor-vehicle, the combination with a transverse casing, of driving-wheels, bearing members therefor, a yielding connection between said bearing members and said casing, a drive-shaft mounted in bearings in said casing, said drive-shaft comprising end sections and an intermediate section, and clutch mechanism for connecting said sections together, the end sections of said shaft secured to the said drive-wheels, and including universal joints, and a telescopic section.

7. In a motor-vehicle, the combination with a transverse engine-casing, and engine elements supported thereby, of drive-wheels, bearing members therefor pivoted to the said engine-casing, and a drive-shaft mounted in bearings in the said engine-casing, said drive-shaft secured to the said drive-wheels.

8. In a motor-vehicle, the combination with a transverse engine-casing, and engine elements supported thereby, of drive-wheels, bearing members therefor pivoted to the said engine-casing, and a drive-shaft mounted in bearings in the said engine-casing, said drive-shaft secured to the said drive-wheels, and including universal joints.

9. In a motor-vehicle, the combination with a transverse engine-casing, and engine elements supported thereby, of drive-wheels, bearing members therefor pivoted to the said engine-casing, and a drive-shaft mounted in bearings in the said engine-casing, said drive-shaft secured to the said drive-wheels, and including universal joints, and a telescopic section.

10. In a motor-vehicle, the combination with a transverse engine-casing, and engine elements supported thereby, of drive-wheels, bearing members therefor pivoted to the said engine-casing, a drive-shaft mounted in bearings in the said engine-casing, said drive-shaft comprising end sections and an intermediate section, and clutch mechanism for connecting said sections together in driving relation, the end sections of said shaft secured to the said driving-wheels.

11. In a motor-vehicle, the combination with a transverse engine-casing, and engine elements supported thereby, of drive-wheels, bearing members therefor pivoted to the said engine-casing, a drive-shaft mounted in bearings in the said engine-casing, said drive-shaft comprising end sections and an intermediate section, and clutch mechanism for connecting said sections together in driving relation, the end sections of said shaft secured to the said driving-wheels, and including universal joints.

12. In a motor-vehicle, the combination with a transverse engine-casing, and engine elements supported thereby, of drive-wheels, bearing members therefor pivoted to the said engine-casing, a drive-shaft mounted in bearings in the said engine-casing, said drive-shaft comprising end sections and an intermediate section, and clutch mechanism for connecting said sections together in driving relation, the end sections of said shaft secured to the said driving-wheels, and including universal joints, and a telescopic section.

13. In a motor-vehicle, the combination with a transverse casing, of driving-wheels, bearing members therefor pivoted to the said casing, and yieldingly supporting same, and a drive-shaft mounted in bearings in said casing, said drive-shaft secured to said drive-wheels.

14. In a motor-vehicle, the combination with a transverse casing, of driving-wheels, bearing members therefor pivoted to the said casing, and yieldingly supporting same, a drive-shaft mounted in bearings in said casing, said drive-shaft secured to said drive-wheels, and including universal joints.

15. In a motor-vehicle, the combination with a transverse casing, of driving-wheels, bearing members therefor pivoted to the said casing, and yieldingly supporting same, a drive-shaft mounted in bearings in said casing, said drive-shaft secured to said drive-wheels, and including universal joints, and a telescopic section.

16. In a motor-vehicle, the combination with a transverse casing, of driving-wheels, bearing members therefor pivoted to the said casing, and yieldingly supporting same, a drive-shaft mounted in bearings in said casing, said drive-shaft comprising end sections and an intermediate section, clutch mechanism for connecting said sections together, the end sections of said shaft secured to the said drive-wheels.

17. In a motor-vehicle, the combination with a transverse casing, of driving-wheels, bearing members therefor pivoted to the said casing, and yieldingly supporting same, a drive-shaft mounted in bearings in said casing, said drive-shaft comprising end sections and an intermediate section, clutch mechanism for connecting said sections together, the end section of said shaft secured to the said drive-wheels, and including universal joints.

18. In a motor-vehicle, the combination with a transverse casing, of driving-wheels, bearing members therefor pivoted to the said casing, and yieldingly supporting same, a drive-shaft mounted in bearings in said casing, said drive-shaft comprising end sections and an intermediate section, clutch mechanism for connecting said sections together, the end section of said shaft secured to the said drive-wheels, and including universal joints, and a telescopic section.

19. In a motor-vehicle, the combination of two driving-wheels, a motor located between them and having a driving-shaft connected to said wheels, said shaft comprising end sections and an intermediate section, and clutch mechanism for connecting said sections together.

20. In a motor-vehicle, the combination with vehicle driving-wheels of a driving-motor located between the same, and with its driving-shaft approximately in axial line, when in normal position, with the axis of rotation of the said wheels, said shaft having a direct driving connection with said wheels.

21. In a motor-vehicle, the combination with vehicle driving-wheels of a driving-motor located between the same, and with its driving-shaft approximately in axial line, when in normal position, with the axis of rotation of the said wheels, said shaft having a direct driving connection with said wheels, and comprising universal joints permitting pivotal movements of said wheels.

22. In a motor-vehicle, the combination with vehicle driving-wheels of a driving-motor located between the same, and with its driving-shaft approximately in axial line, when in normal position, with the axis of the said wheels, said shaft comprising end sections and an intermediate section, and clutch mechanism for directly connecting the said sections together, the end sections of said shaft secured to the said driving-wheels.

23. In a motor-vehicle, the combination with vehicle driving-wheels of a driving-motor located between the same, and with its driving-shaft approximately in axial line, when in normal position, with the axis of the said wheels, said shaft comprising end sections and an intermediate section, clutch mechanism for directly connecting the said sections together, the end sections of said shaft secured to the said driving-wheels, and including universal joints permitting steering movements of said wheels.

24. In a motor-vehicle, the combination with vehicle driving-wheels of a driving-motor located between the same, and with its driving-shaft approximately in axial line, when in normal position, with the axis of the said wheels, said shaft comprising end sections and an intermediate section, clutch mechanism for directly connecting the said sections together, the end sections of said shaft secured to the said driving-wheels, and including universal joints permitting steering movements of said wheels, and a telescopic section.

25. In a motor-vehicle, the combination with a motor frame or casing constituting the front axle of the machine, and to which the front wheels may be secured, of a drive-shaft journaled in the said motor-frame, and arranged to directly connect with the said wheels in driving connection.

26. In a motor-vehicle, a motor comprising a frame or casing constituting the front axle of the machine, and provided with means by which the front wheels may be secured thereto, the motor-shaft constituting the drive-shaft for the wheels and arranged to be directly connected thereto in driving relation.

27. In a motor-vehicle, a motor comprising a frame or casing constituting the front axle of the machine, and provided with means by which the front wheels may be secured thereto, the motor-shaft constituting the drive-shaft for the wheels and comprising end sections arranged to be rigidly secured to the wheels, and an intermediate section, and clutch mechanism for securing the said sections together.

28. In a motor-vehicle, the combination with a motor frame or casing constituting the front axle of the machine, and wheel-bearing members pivoted thereto, of a drive-shaft journaled in the said motor-frame and the said bearing members, said drive-shaft including universal joints.

29. In a motor-vehicle, the combination with a motor frame or casing constituting the front axle of the machine, and wheel-bearing members pivoted thereto, of a drive-shaft journaled in the said motor-frame and the said bearing members, said drive-shaft including universal joints, and telescopic sections.

30. In a motor-vehicle, the combination with a motor frame or casing constituting the front axle of the machine, and wheel-bearing members pivoted thereto, of a drive-shaft comprising end sections journaled in the said bearing members, and an intermediate section journaled in the said motor-frame, said end sections including universal joints.

31. In a motor-vehicle, the combination with a motor frame or casing constituting the front axle of the machine, and wheel-bearing members pivoted thereto, of a drive-shaft comprising end sections journaled in the said bearing members, and an intermediate section journaled in the said motor-frame, said end sections including universal joints, and telescopic sections.

32. In a motor-vehicle, the combination with a motor frame or casing constituting the front axle of the machine, and wheel-bearing members pivoted thereto, of a drive-shaft comprising end sections journaled in the said bearing members, an intermediate section journaled in the said motor-frame, said end sections including universal joints, and clutch mechanism for securing the said sections together.

33. In a motor-vehicle, a transverse casing comprising end portions having means for the attachment of wheel-bearing members, and an intermediate portion constituting an engine-crank case.

34. In a motor-vehicle the combination with a transverse casing comprising end portions having projecting horns, and an intermediate portion constituting an engine-crank case, of wheel-bearing members pivotally connected to said horns, and engine elements supported by said crank-case.

35. In a motor-vehicle, the combination with driving-wheels, of a driving-shaft therefor comprising intermediate and end sections, the end sections secured to the said wheels, and clutch mechanism for connecting the said sections together, said end sections comprising universal joints and telescopic sections.

36. In a motor-vehicle, the combination with driving-wheels, of a driving-shaft therefor comprising an intermediate crank-shaft section and end sections, the end sections secured to the said wheels, and clutch mechanism for connecting the said sections together, said end sections comprising universal joints and telescopic sections.

37. In a motor-vehicle, the combination with driving-wheels, of a driving-shaft therefor comprising intermediate and end sections, the end sections secured to the said wheels, and clutch mechanism for connecting the said sections together, said end sections each comprising two universal joints and a telescopic section.

38. In a motor-vehicle, the combination with driving-wheels, of a driving-shaft therefor comprising an intermediate crank-shaft section and end sections, the end sections secured to the said wheels, and clutch mechanism for connecting the said sections together, said end sections each comprising two universal joints and a telescopic section.

39. In a motor-vehicle, the combination with driving-wheels, of a driving-shaft therefor comprising an intermediate crank-shaft section and end sections, the end sections secured to the said wheels, clutch mechanism for connecting the said sections together, said end sections comprising universal joints and hollow telescopic sections, said telescopic sections arranged to slide in hollow portions of the crank-shaft, and cup-shaped bushings arranged between the telescopic sections and the intermediate crank-shaft section, and inclosing the ends of the said telescopic sections.

40. In a motor-vehicle, the combination with a frame or casing and wheel-bearing members pivoted thereto, of a drive-shaft comprising an intermediate portion journaled in said casing, and end portions comprising shaft-sections mounted to rotate in said wheel-bearing members and arranged to be secured to driving-wheels of the vehicle, telescopic sections arranged to slide longitudinally with respect to said intermediate shaft portion, and universal joints between said end shaft-sections and said telescopic sections.

41. In a motor-vehicle, the combination with a frame or casing and wheel-bearing members pivoted thereto, and having also a movement with respect thereto in a line with the axes of said pivotal connections, of a drive-shaft comprising an intermediate portion journaled in said casing, and end portions comprising shaft-sections mounted to rotate in said wheel-bearing members and arranged to be secured to driving-wheels of the vehicle, telescopic sections arranged to slide longitudinally with respect to said intermediate shaft portion, and universal joints between said end shaft-sections and said telescopic sections.

42. In a motor-vehicle, the combination with a frame or casing and a wheel-bearing member, of a drive-shaft comprising a driving member having one member of a clutch secured thereto, said driving member mounted to rotate in bearings of said frame or casing, a telescopic section arranged to slide longitudinally with respect to said driving member and to rotate freely with respect thereto, a clutch member rotatively secured to said telescopic section, and arranged to slide longitudinally with respect thereto and with respect to the first said clutch member, with which it is adapted to engage, an end shaft-section mounted to rotate in said wheel-bearing member and arranged to be directly connected to a drive-wheel of the vehicle, and a universal-joint connection between said telescopic section and said end shaft-section.

43. In a motor-vehicle, the combination with a frame or casing and a wheel-bearing member, of a drive-shaft comprising a driving member having one member of a clutch secured thereto, said driving member mounted to rotate in bearings of said frame or casing, a telescopic section arranged to slide longitudinally with respect to said driving member and to rotate freely with respect thereto, a clutch member rotatively secured to said telescopic section, and arranged to slide longitudinally with respect thereto and with respect to the first said clutch member, with which it is adapted to engage, an end shaft-section mounted to rotate in said wheel-bearing member and arranged to be directly connected to a drive-wheel of the vehicle, and two universal joints between said telescopic section and said end shaft-section.

44. In a motor-vehicle, the combination with a frame or casing and a wheel-bearing member, of a drive-shaft comprising a driving member having one member of the clutch secured thereto, said driving member mounted to rotate in bearings of said frame or casing, a telescopic section arranged to slide longitudinally with respect to said driving member and to rotate freely with respect thereto, a clutch member rotatively secured to said telescopic section, and arranged to slide longitudinally with respect thereto and with respect to the first said clutch member, with which it is adapted to engage, an end shaft-section mounted to rotate in said wheel-bearing member, and arranged to be directly connected to a drive-wheel of the vehicle, and two universal joints between said telescopic section and said end shaft-section, the said telescopic section and clutch member therewith arranged to rotate in roller-bearings supported by the said frame or casing.

45. In a motor-vehicle, the combination with a frame or casing and wheel-bearing members pivoted thereto, of a drive-shaft comprising a driving member having one member of a clutch, and a driving-pinion, secured thereto, said driving member mounted to rotate in bearings of said frame or casing, a telescopic section arranged to slide longitudinally with respect to said driving member and to rotate freely with respect thereto, a clutch member rotatively secured to said telescopic section, and arranged to slide longitudinally with respect thereto and with respect to the first said clutch member, with which it is adapted to engage, said clutch member carrying a gear-wheel, an end shaft-section mounted to rotate in said wheel-bearing member, and arranged to be directly connected to a drive-wheel of the vehicle, and a universal-joint connection between said telescopic section and said end shaft-section.

46. In a motor-vehicle, the combination with a frame or casing having horns for pivotally engaging wheel-bearing members, of wheel-bearing members pivoted to said horns, said pivotal connections permitting sliding movements between said casing or frame and said wheel-bearing members, and a spring-support between the said frame and the wheel-bearing members.

47. In a motor-vehicle, the combination with a frame or casing provided with horns having tubular sockets, of wheel-bearing members provided with pivot-pins engaging said sockets and arranged to slide therein, and springs between the wheel-bearing members and the said casing-horns.

48. In a motor-vehicle, the combination with a frame or casing provided with horns having closed tubular sockets, of wheel-bearing members provided with pivot-pins fitted to said sockets and arranged to slide therein, said pins and sockets constituting air dash-pots, and springs between the wheel-bearing members and the said casing-horns.

49. In a motor-vehicle, the combination with a frame or casing having horns for pivotally engaging wheel-bearing members, of wheel-bearing members pivoted to said horns, said pivotal connections permitting sliding movements between said casing or frame and said wheel-bearing members, a spring-support between the said frame and the wheel-bearing members, and wheels mounted to rotate in said bearing members, the axial lines of said pivotal connections passing through the center of said wheel-treads.

50. In a motor-vehicle, the combination with a frame or casing having horns for pivotally engaging wheel-bearing members, of wheel-bearing members pivoted to said horns, said pivotal connections permitting sliding movements between said casing or frame and said wheel-bearing members, a spring-support between the said frame and the wheel-bearing members, and wheels mounted to rotate in said bearing members, said wheels having offset spokes and rims overhanging the said pivotal connections.

51. In a motor-vehicle the combination with a frame or casing having horns for engaging a wheel-bearing member, said horns having upper and lower tubular sockets in a line with each other, the upper socket closed to the atmosphere at its upper end, of a wheel-bearing member comprising a tubular section and upper and lower pivot-pins fitted to the said sockets and arranged to slide therein, and a coil-spring surrounding the upper socket and pivot-pin, and yieldingly supporting the said frame or casing upon the said bearing member.

52. In a motor-vehicle, the combination with a casing or support, and a wheel-bearing member pivoted thereto, said wheel-bearing member provided with an open-ended cap having an outer bearing-surface formed upon an arc whose center lies in the axis of said pivotal connection, said casing or support having a correspondingly-curved surface with which the bearing-surface of said cap engages.

53. In a motor-vehicle, the combination with a casing or support, and a wheel-bearing member pivoted thereto, said wheel-bearing member provided with an open-ended cap having an outer cylindrical bearing-surface concentric with the axis of said pivotal connection, said casing or support having a correspondingly-curved cylindrical surface with which the bearing-surface of said cap engages.

54. In a motor-vehicle, the combination with a casing or support, and a wheel-bearing member pivoted thereto, said wheel-bearing member having also a movement with respect to said casing or support in a line with the axis of said pivotal support, said wheel-bearing member provided with an open-ended cap having an outer cylindrical bearing-surface concentric with the axis about which it turns, said casing or support having a correspondingly-curved cylindrical surface with which the bearing-surface of said cap engages.

55. In a motor-vehicle, the combination with a casing or support and a wheel-bearing member pivoted thereto, said casing provided with a curved surface having an arc, the center of which is on the axis of said pivotal connection, of a cap projecting from said wheel-bearing member, and having a face fitted to the said curved surface, and a drive-shaft extending through the said cap into the said bearing member.

56. In a motor-vehicle, the combination with an axle member having means for the pivotal attachment thereto of wheel-bearing members, of wheel-bearing members, a driving-shaft comprising intermediate and end sections and universal joints connecting the same, the end sections mounted within said wheel-bearing members, said wheel-bearing members having inward extensions, inclosing in part the said universal joints, arranged to sweep against curved portions of the axle member during motion of the wheel-bearing member about its pivot.

57. In a motor-vehicle, the combination with driving-wheels, a driving-shaft therefor comprising intermediate and end sections, the end sections secured to said wheels, and clutch mechanism for connecting the said sections together, of low-speed gearing arranged to be interposed between the intermediate and end shaft-sections, and including compensating gearing, and clutch mechanism for said low-speed gearing.

58. In a motor-vehicle, the combination with driving-wheels, a driving-shaft therefor comprising intermediate and end sections, the end sections secured to said wheels, and clutch mechanism for connecting the said sections together, of low-speed gearing arranged between the intermediate and end shaft-sections, including gear-wheels arranged to be thrown into, and out of, operative engagement with the remainder of said gearing, said low-speed gearing including compensating gearing, and clutch mechanism for the said low-speed gearing.

59. In a motor-vehicle, the combination with driving-wheels, a driving-shaft therefor comprising intermediate and end sections, the end sections secured to said wheels, and clutch mechanism for connecting the said sections together, of a drive-pinion carried by the intermediate shaft-section, a two-part countershaft, compensating gear connecting the two parts together in driving relation, said compensating gear driven by said driving-pinion, and shift-gears between said two-part counter-shaft and the end sections of said driving-shaft.

60. In a motor-vehicle, the combination with driving-wheels, a driving-shaft therefor comprising intermediate and end sections, the end sections secured to said wheels, and clutch mechanism for connecting the said sections together, of a drive-pinion carried by the intermediate shaft-section, a two-part countershaft, compensating gear connecting the two parts together in driving relation, said compensating gear driven by said drive-pinion, gears between said two-part counter-shaft and the end sections of said driving-shaft and clutch mechanism controlling driving connection through said counter-shaft.

61. In a motor-vehicle, the combination with driving-wheels, a driving-shaft therefor comprising intermediate and end sections, the end sections secured to said wheels, and clutch mechanism for connecting the said sections together, of a drive-pinion carried by the intermediate shaft-section, a two-part countershaft, compensating gear connecting the two parts together in driving relation, said compensating gear driven by said driving-pinion, shift-gears between said two-part countershaft and the end sections of said driving-shaft, and clutch mechanism controlling operative connection between said pinion and said compensating gear.

62. In a motor-vehicle the combination with driving-wheels, a driving-shaft therefor comprising intermediate and end sections, the end sections secured to said wheels, and clutch-mechanism for connecting the said sections together, of a drive-pinion carried by the intermediate shaft-section, a spur-gear in mesh with said drive-pinion, a two-part counter-shaft, compensating gear connecting the two said parts together in driving relation but permitting relative rotation thereof, clutch mechanism between said spur-gear and the driving member of said compensating gear, and gearing for connecting the two-part counter-shaft with the end sections of said driving-shaft.

63. In a motor-vehicle the combination with driving-wheels, a driving-shaft therefor comprising intermediate and end sections, the end sections secured to said wheels, and clutch mechanism for connecting the said sections together, of a drive-pinion carried by the intermediate shaft-section, a spur-gear in mesh with said drive-pinion, a two-part counter-shaft, compensating gear connecting the two said parts together in driving relation but permitting relative rotation thereof, toggle friction-clutch mechanism between said spur-gear and the driving member of said compensating gear, and gearing for connecting the two-part counter-shaft with the end sections of said driving-shaft.

64. In a motor-vehicle the combination with driving-wheels, a driving-shaft therefor comprising intermediate and end sections, the end sections secured to said wheels, and clutch mechanism for connecting the said sections together, of a drive-pinion carried by the intermediate shaft-section, a spur-gear in mesh with said drive-pinion, a two-part counter-shaft, compensating gear connecting the two said parts together in driving relation but permitting relative rotation thereof, clutch mechanism between said spur-gear and the driving member of said compensating gear, and shift-gears arranged when in engagement to connect the two parts of the counter-shaft with the end sections of the said driving-shaft, said shift-gears adapted to be disconnected from operative relation.

65. In a motor-vehicle the combination with driving-wheels, a driving-shaft therefor comprising intermediate and end sections, the end sections secured to said wheels, and clutch mechanism for connecting the said sections together, of a drive-pinion carried by the intermediate shaft-section, a spur-gear in mesh with said drive-pinion, a two-part counter-shaft, compensating gear connecting the two said parts together in driving relation but permitting relative rotation thereof, clutch mechanism between said spur-gear and the driving member of said compensating gear, and shift-gears arranged when in engagement to connect the two parts of the counter-shaft with the end sections of the said driving-shaft, said shift-gears adapted to be disconnected from operative relation, under control of the said clutch mechanism for directly connecting the driving-shaft sections together.

66. In a motor-vehicle the combination with driving-wheels, a driving-shaft therefor comprising intermediate and end sections, the end sections secured to said wheels, and clutch mechanism for connecting the said sections together, of a drive-pinion secured to and carried by the intermediate shaft-section, a spur-gear in mesh with said drive-pinion, a two-part counter-shaft arranged to rotate upon the axis of rotation of said drive-pinion but unconnected therewith, compensating gear connecting the two parts of the counter-shaft together in driving relation with each other, clutch mechanism between said spur-gear and the driving member of said compensating gear, and gearing for connecting the two-part counter-shaft with the end sections of said driving-shaft.

67. In a motor-vehicle the combination with driving-wheels, a driving-shaft therefor comprising intermediate and end sections, the end sections secured to said wheels, and clutch mechanism for connecting the said sections together, of a drive-pinion secured to and carried by the intermediate shaft-section, a spur-gear in mesh with said drive-pinion, a two-part counter-shaft arranged to rotate upon the axis of rotation of said drive-pinion but unconnected therewith, compensating gear connecting the two parts of the counter-shaft together in driving relation with each other, clutch mechanism between said spur-gear and the driving member of said compensating gear, and shift-gears arranged when in engagement to connect the two parts of the counter-shaft with the end sections of the said driving-shaft, said shift-gears adapted to be disconnected from operative relation.

68. In a motor-vehicle the combination with driving-wheels, a driving-shaft therefor comprising intermediate and end sections, the end sections secured to said wheels, and clutch mechanism for connecting the said sections together, of a drive-pinion secured to and carried by the intermediate shaft-section, a spur-gear in mesh with said drive-pinion, a two-part counter-shaft arranged to rotate upon the axis of rotation of said drive-pinion but unconnected therewith, compensating gear connecting the two parts of the counter-shaft together in driving relation with each other, clutch mechanism between said spur-gear and the driving member of said compensating gear, and shift-gears arranged when in engagement to connect the two parts of the counter-shaft with the end sections of the said driving-shaft, said shift-gears adapted to be disconnected from operative relation, under control of the said clutch mechanism for directly connecting the driving-shaft sections together.

69. In a motor-vehicle, the combination with driving-wheels, and a motor between said wheels having a main driving-shaft adapted for direct connection thereto, of low-speed gearing arranged to be driven from said motor and to drive said vehicle-wheels and comprising compensating gearing, and clutch mechanism for the direct and low speed drive.

70. In a motor-vehicle, the combination with driving-wheels, a motor between said wheels having a driving-shaft directly connected to said wheels and comprising intermediate and end sections, and clutch mechanism for connecting and disconnecting said sections, of a two-part counter-shaft, a compensating gear arranged to drive the two sections of said shaft, gearing for connecting the sections individually with the vehicle-wheels, and other gearing connecting the intermediate section of the motor-shaft with said compensating gear and comprising clutch mechanism for connecting and disconnecting said compensating gear from said intermediate shaft-section.

71. In a motor-vehicle, the combination with driving-wheels, a driving-shaft therefor comprising intermediate and end sections, the end sections secured to said wheels, and clutch mechanism for connecting the said sections together, or low-speed reverse-gearing arranged to be interposed between the intermediate and end shaft-sections, and including compensating gearing, and clutch mechanism for said low-speed reverse-gearing.

72. In a motor-vehicle, the combination with driving-wheels, a driving-shaft therefor comprising intermediate and end sections, the end sections secured to said wheels, and clutch mechanism for connecting the said sections together, of low-speed reverse-gearing arranged between the intermediate and end shaft-sections, including gear-wheels arranged to be thrown into, and out of, operative engagement with the remainder of said gearing, said low-speed reverse-gearing including compensating gearing, and clutch mechanism for the said low-speed reverse-gearing.

73. In a motor-vehicle, the combination with driving-wheels, a driving-shaft therefor comprising intermediate and end sections, the end sections secured to said wheels, and clutch mechanism for connecting the said sections together, of a drive-pinion carried by the intermediate shaft-section, a two-part counter-shaft, compensating gear connecting the two parts together in driving relation, reverse driving-gearing between the driving member of said compensating gear and the said drive-pinion, and shift-gears between said two-part counter-shaft and the end sections of said driving-shaft.

74. In a motor-vehicle, the combination with driving-wheels, a driving-shaft therefor comprising intermediate and end sections, the end sections secured to said wheels, and clutch mechanism for connecting the said sections together, of a drive-pinion carried by the intermediate shaft-section, a two-part counter-shaft, compensating gear connecting the two parts together in driving relation, reverse driving-gearing between the driving member of said compensating gear and the said drive-pinion, gears between the two-part counter-shaft and the end sections of said driving-shaft, and clutch mechanism controlling driving connection through said counter-shaft.

75. In a motor-vehicle, the combination with driving-wheels, a driving-shaft therefor comprising intermediate and end sections, the end sections secured to said wheels, and clutch mechanism for connecting the said sections together, of a drive-pinion carried by the intermediate shaft-section, a two-part counter-shaft, compensating gear connecting the two parts together in driving relation, reverse driving-gearing between the driving member of said compensating gear and the said drive-pinion, shift-gears between said two-part counter-shaft and the end sections of said driving-shaft, and clutch mechanism controlling operative connection between said drive-pinions and said compensating gear.

76. In a motor-vehicle, the combination with driving-wheels, a driving-shaft therefor comprising intermediate and end sections, the end sections secured to said wheels, and clutch mechanism for connecting the said sections together, of a drive-pinion carried by the intermediate shaft-section, a spur-gear in mesh with said drive-pinion, a two-part counter-shaft, compensating gears connecting the two said parts together in driving relation but permitting relative rotation thereof, reverse-gearing between the said spur-gear and the driving member of said compensating gear, clutch mechanism therefor, and gearing for connecting the two-part counter-shaft with the end sections of said shaft.

77. In a motor-vehicle, the combination with driving-wheels, a driving-shaft therefor comprising intermediate and end sections, the end sections secured to said wheels, and clutch mechanism for connecting the said sections together, of a drive-pinion carried by the intermediate shaft-section, a spur-gear in mesh with said drive-pinion, a two-part counter-shaft, compensating gears connecting the two said parts together in driving relation but permitting relative rotation thereof, reverse-gearing between the said spur-gear and the driving member of said compensating gear, clutch mechanism therefor including a shift-gear, and gearing for connecting the two-part counter-shaft with the end sections of said driving-shaft.

78. In a motor-vehicle, the combination with driving-wheels, a driving-shaft therefor comprising intermediate and end sections, the end sections secured to said wheels, and clutch mechanism for connecting the said sections together, of a drive-pinion carried by the intermediate shaft-section, a spur-gear in mesh with said drive-pinion, a two-part countershaft, compensating gears connecting the two said parts together in driving relation but permitting relative rotation thereof, reverse-gearing between the said spur-gear and the driving member of said compensating gear, clutch mechanism therefor including friction members and a shift-gear, and gearing for connecting the two-part counter-shaft with the end sections of said driving-shaft.

79. In a motor-vehicle, the combination with driving-wheels, a driving-shaft therefor comprising intermediate and end sections, the end sections secured to said wheels, and clutch mechanism for connecting the said sections together, of a drive-pinion secured to and carried by the intermediate shaft-section, a spur-gear in mesh with said drive-pinion, a two-part counter-shaft arranged to rotate upon the axis of rotation of said drive-pinion but unconnected therewith, compensating gear connecting the two parts of the counter-shaft together in driving relation with each other, reverse-gearing between the said spur-gear and the driving member of said compensating gear, clutch mechanism therefor, and gearing for connecting the two-part counter-shaft with the end sections of said driving-shaft.

80. In a motor-vehicle, the combination with driving-wheels, a driving-shaft therefor comprising intermediate and end sections, the end sections secured to said wheels, and clutch mechanism for connecting the said sections together, of a drive-pinion secured to and carried by the intermediate shaft-section, a spur-gear in mesh with said drive-pinion, a two-part counter-shaft arranged to rotate upon the axis of rotation of said drive-pinion but unconnected therewith, compensating gear connecting the two parts of the counter-shaft together in driving relation with each other, reverse-gearing between the said spur-gear and the driving member of said compensating gear, clutch mechanism therefor, including friction members and a shift-gear, and gearing for connecting the two-part counter-shaft with the end sections of said driving-shaft.

81. In a motor-vehicle, the combination with driving-wheels, a driving-shaft therefor and means for connecting said shaft directly thereto, of low-speed reverse-gearing likewise arranged to drive said wheels and comprising compensating gearing, and clutch mechanism for throwing said low-speed reverse-gearing into and out of action, including friction members and a shift-gear.

82. In a motor-vehicle, the combination with driving-wheels, a driving-shaft therefor and means for connecting said shaft directly thereto, of low-speed reverse-gearing likewise arranged to drive said wheels and comprising compensating gearing, and clutch mechanism for throwing said low-speed reverse-gearing into and out of action, including two friction members connected to move together, one of said members carrying a shift-gear comprised in the said reverse-gear train.

83. In a motor-vehicle, the combination with driving-wheels, and a motor between said wheels having a main driving-shaft adapted for direct connection thereto, of low-speed gearing arranged to be driven from said motor and to drive said vehicle-wheels and comprising compensating gearing, reversing-gearing likewise arranged to be driven from the motor and to drive said compensating gearing, and clutch mechanism for the direct and low-speed drive and for the said reversing-gearing.

84. In a motor-vehicle, the combination with driving-wheels, a motor arranged between them, having a shaft arranged to be directly connected to said wheels and comprising an intermediate and end sections and clutch mechanism connecting the sections together, of a two-part counter-shaft and a compensating gear arranged to drive the two sections of said shaft, gearing for connecting the said sections individually with the driving-wheels, gearing connecting the intermediate motor-shaft sections with the compensating gear, reversing back gearing likewise driven from the intermediate section of the motor-shaft and likewise arranged to drive the compensating gear, said reversing back gearing comprising clutch means for throwing it into and out of action.

85. In a motor-vehicle, the combination with driving-wheels, of a high and low speed forward drive for same, and a reverse low-speed drive, the high-speed drive arranged to drive the wheels in direct connection, and the forward and reverse low-speed drives including intermediate and compensating gearing, and clutch mechanism for the said drives.

86. In a motor-vehicle, the combination with driving-wheels, a driving-shaft therefor, and means for connecting said shaft directly thereto, of low-speed speed-gearing for forward and rear driving, likewise arranged to drive said wheels and comprising compensating gearing, and clutch mechanism for throwing said low-speed into and out of action and for reversing the direction of drive.

87. In a motor-vehicle, the combination with driving-wheels, a driving-shaft therefor comprising intermediate and end sections, the end sections secured to the said wheels, and clutch mechanism for connecting the said sections together, of low-speed forward and reverse gearing arranged to be interposed between the intermediate and end shaft-sections, including compensating gearing, and clutch mechanism for said low-speed forward and reverse gearing.

88. In a motor-vehicle, the combination with driving-wheels, a driving-shaft therefor comprising intermediate and end sections, the end sections secured to the said wheels, and clutch mechanism for connecting the said sections together, of low-speed forward and reverse gearing arranged between the intermediate and end shaft-sections, including gear-wheels arranged to be thrown into, and out of, operative engagement with the remainder of said gearing, said low-speed reverse-gearing including compensating gearing, and clutch mechanism for the said low-speed reverse-gearing.

89. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a two-part counter-shaft, compensating gear connecting the two parts together in driving relation but permitting relative rotation thereof, and forward and reverse driving connections between said driving-pinion and the driving member of the compensating gear.

90. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a two-part counter-shaft, compensating gear connecting the two parts together in driving relation but permitting relative rotation thereof, forward and reverse driving connections between said driving-pinion and the driving member of the compensating gear, and shift-gears between the two-part counter-shaft and the end sections of said driving-shaft.

91. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a two-part counter-shaft, compensating gear connecting the two parts together in driving relation but permitting relative rotation thereof, forward and reverse driving connections between said driving-pinion and the driving member of the compensating gear, gears between said two-part counter-shaft and the end sections of said driving-shaft, and clutch mechanism for controlling driving connection through said counter-shaft.

92. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a two-part counter-shaft, compensating gear connecting the two parts together in driving relation but permitting relative rotation thereof, forward and reverse driving connections between said driving-pinion and the driving member of the compensating gear, shift-gears between said two-part counter-shaft and the end sections of said driving-shaft, and clutch mechanism controlling operative connection between said drive-pinion and said compensating gear.

93. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a spur-gear in mesh with said drive-pinion, a two-part counter-shaft, compensating gear connecting the two said parts together in driving relation but permitting relative rotation thereof, clutch mechanism between the said spur-gear and the driving member of the said compensating gear, reversing-gearing between the said spur-gear and the said compensating-gear-driving member, clutch mechanism for the said reversing-gear, and gearing for connecting the two-part counter-shaft with the end section of said drive-shaft.

94. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a spur-gear in mesh with said drive-pinion, a two-part counter-shaft, compensating gear connecting the two said parts together in driving relation but permitting relative rotation thereof, clutch mechanism between the said spur-gear and the driving member of the said compensating gear, reversing-gearing between the said spur-gear and the said compensating-gear-driving member, clutch mechanism for the said reversing-gear, and shift-gears arranged when in engagement to connect the two parts of the counter-shaft with the end sections of the said driving-shaft, said shift-gears adapted to be disconnected from operative relation.

95. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a spur-gear in mesh with said drive-pinion, a two-part counter-shaft, compensating gear connecting the two said parts together in driving relation but permitting relative rotation thereof, clutch mechanism between the said spur-gear and the driving member of the said compensating gear, reversing-gearing between the said spur-gear and the said compensating-gear-driving member, clutch mechanism for the said reversing-gear, and shift-gears arranged when in engagement to connect the two parts of the counter-shaft with the end sections of the said driving-shaft, said shift-gears adapted to be disconnected from operative relation, under control of the said clutch mechanism for directly connecting the driving-shaft sections together.

96. In a motor-vehicle, the combination with driving-wheels, a driving-shaft therefor comprising intermediate and end sections, the end sections secured to said wheels, and clutch mechanism for connecting the said sections together, of a drive-pinion secured to and carried by the intermediate shaft-section, a spur-gear in mesh with said drive-pinion, a two-part counter-shaft arranged to rotate upon the axis of rotation of said drive-pinion but unconnected therewith, compensating gear connecting the two parts of the counter-shaft together in driving relation with each other, but permitting relative rotation thereof, clutch mechanism between the said spur-gear and the driving member of the said compensating gear, reversing-gearing between the said spur-gear and the said compensating-gear-driving member, clutch mechanism for the said reversing-gear, and gearing for connecting the two-part counter-shaft with the end sections of said drive-shaft.

97. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a two-part counter-shaft, compensating gearing between the two said counter-shaft parts, means for driving the compensating gearing directly from the drive-pinion, a second counter-shaft in gear with the said drive-pinion, reversing-gearing driven by the second counter-shaft, means for driving the compensating gearing through the said reversing-gear, and gearing between the two-part counter-shaft and the end sections of said driving-shaft.

98. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a two-part counter-shaft, compensating gearing between the two said counter-shaft parts, means for driving the compensating gearing and said two-part counter-shaft directly from said drive-pinion or indirectly through said second counter-shaft, and gearing between the two-part counter-shaft and the end sections of said driving-shaft.

99. In a motor-vehicle, the combination with driving-wheels, a driving-shaft therefor comprising intermediate and end sections, the end sections secured to the said wheels, and clutch mechanism for connecting the said sections together, of a two-part counter-shaft and compensating gearing for low-speed driving connection, a second counter-shaft carrying back gears, and connections therefrom for reverse driving, and a circulating-pump driven from said second counter-shaft.

100. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a two-part counter-shaft, compensating gearing between the two said counter-shaft parts, means for driving the compensating gearing directly from the drive-pinion, a second counter-shaft in gear with the said drive-pinion, reversing-gearing driven by the second counter-shaft, means for driving the compensating gearing through the said reversing-gear, a circulating-pump driven from said second counter-shaft, and gearing between the two-part counter-shaft and the end sections of said driving-shaft.

101. In a motor-vehicle, the combination with driving-wheels, a driving-shaft therefor comprising intermediate and end sections, the end sections secured to the said wheels, and clutch mechanism for connecting the said sections together, of a drive-pinion carried by the intermediate shaft-section, a spur-gear in mesh with said drive-pinion, a two-part counter-shaft, compensating gear connecting the two said parts together in driving relation but permitting relative rotation thereof, clutch mechanism between the said spur-gear and the driving member of the said compensating gear, reversing-gearing between the said spur-gear and the said compensating-gear-driving member, said reversing-gear including a shaft in gear with the said spur-gear, a circulating-pump driven by said reversing-gearing shaft, clutch mechanism for the said reversing-gear, and gearing for connecting the two-part counter-shaft with the end sections of said drive-shaft.

Witness my hand this 13th day of January, 1904.

WALTER CHRISTIE.

Witnesses:
 JAMES WARES BRYCE,
 D. HOWARD HAYWOOD.